United States Patent
Dunning et al.

(10) Patent No.: US 11,093,416 B1
(45) Date of Patent: Aug. 17, 2021

(54) MEMORY SYSTEM SUPPORTING PROGRAMMABLE SELECTIVE ACCESS TO SUBSETS OF PARALLEL-ARRANGED MEMORY CHIPS FOR EFFICIENT MEMORY ACCESSES

(71) Applicant: Qualcomm Intelligent Solutions, Inc., San Diego, CA (US)

(72) Inventors: David Stewart Dunning, Portland, OR (US); Shekhar Yeshwant Borkar, Beaverton, OR (US); Nitin Yeshwant Borkar, Redmond, WA (US); Matthew Scott Radecic, San Diego, CA (US)

(73) Assignee: Qualcomm Intelligent Solutions, Inc, San Diego, CA (US)

( * ) Notice: Subject to any disclaimer, the term of this patent is extended or adjusted under 35 U.S.C. 154(b) by 0 days.

(21) Appl. No.: 16/824,802

(22) Filed: Mar. 20, 2020

(51) Int. Cl.
  *G06F 13/16* (2006.01)
  *G06F 13/40* (2006.01)

(52) U.S. Cl.
  CPC ...... *G06F 13/1668* (2013.01); *G06F 13/4027* (2013.01)

(58) Field of Classification Search
  CPC .................................. G06F 13/16; G06F 13/40
  USPC ............................................................ 710/5
  See application file for complete search history.

(56) References Cited

U.S. PATENT DOCUMENTS

| | | | | |
|---|---|---|---|---|
| 5,572,693 A | * | 11/1996 | Choi | G11C 8/12 711/5 |
| 6,415,348 B1 | * | 7/2002 | Mergard | G06F 13/4004 710/305 |
| 7,307,912 B1 | * | 12/2007 | Vernenker | G11C 7/1006 365/154 |
| 7,698,408 B1 | * | 4/2010 | Johnsen | H04L 43/0811 709/223 |
| 9,432,298 B1 | * | 8/2016 | Smith | H04L 49/9057 |
| 2003/0131161 A1 | * | 7/2003 | Dodd | G06F 13/1668 710/35 |
| 2005/0182885 A1 | * | 8/2005 | Matsui | G06F 13/4018 710/307 |
| 2007/0008763 A1 | * | 1/2007 | Choi | G11C 8/12 365/63 |
| 2007/0033337 A1 | * | 2/2007 | Butt | G11C 7/1078 711/105 |
| 2009/0228631 A1 | * | 9/2009 | Marulkar | G06F 13/1605 711/100 |

(Continued)

*Primary Examiner* — Christopher B Shin
(74) *Attorney, Agent, or Firm* — Withrow & Terranova, PLLC

(57) ABSTRACT

A memory system supporting programmable selective access to subsets of parallel-arranged memory chips for efficient memory accesses is disclosed. A memory controller is programmable to selectively control a number of parallel-arranged memory chips in the memory system activated in a grouping for a memory access based on a memory access policy. The memory access policy is based on the number of memory chips to be activated to achieve the desired data line size for a given memory access. This programmability of the memory controller is made possible by separate dedicated chip select lines being coupled to each memory chip. Being able to only activate a subset of the memory chips for a memory access allows conservation of data bus bandwidth and power that would otherwise by consumed by asserting unused data on the data buses.

26 Claims, 11 Drawing Sheets

(56) References Cited

U.S. PATENT DOCUMENTS

| | | | |
|---|---|---|---|
| 2013/0111122 A1* | 5/2013 | Song | G06F 13/1684 |
| | | | 711/105 |
| 2013/0212329 A1* | 8/2013 | Saito | G06F 13/1684 |
| | | | 711/105 |
| 2013/0262786 A1* | 10/2013 | Takashima | G06F 13/1678 |
| | | | 711/147 |

* cited by examiner

US 11,093,416 B1

MEMORY SYSTEM SUPPORTING PROGRAMMABLE SELECTIVE ACCESS TO SUBSETS OF PARALLEL-ARRANGED MEMORY CHIPS FOR EFFICIENT MEMORY ACCESSES

STATEMENT OF GOVERNMENT SUPPORT

This invention was made with Government support under Agreement No. HR0011-17-3-0005, awarded by DARPA. The Government has certain rights in the invention.

BACKGROUND

I. Field of the Disclosure

The technology of the disclosure relates to a processor-based system that includes a processor for executing computer software, and more particularly to a memory controller in the processor-based system that controls memory access requests to system memory in the processor-based system.

II. Background

Central processing units (CPUs), also known as microprocessors, perform computational tasks in a wide variety of applications. A typical CPU includes one or processors each configured to execute software instructions. The software instructions may instruct a processor to fetch data from a location in system memory (e.g., a dynamic random access memory (DRAM)) as part of a memory read operation, perform one or more CPU operations using the fetched/read data, and generate a result. The generated result may then be stored back into system memory as a memory write operation as part of the instruction's execution in a processor.

FIG. 1A is a schematic diagram of an exemplary processor-based system 100 that includes a CPU 102. The CPU 102 includes a processor 104 that includes a plurality of processor cores 106(0)-106(N-1) in this example, wherein 'N' is equal to any number of processors cores 106(0)-106(N-1) desired. The processor cores 106(0)-106(N-1) are each configured to interface with a memory controller 108 in the processor 104 through a memory interconnect 110 to access a system memory 112. In this example, the memory controller 108 is integrated with the CPU 102 and is thus also known as an integrated memory controller (IMC). The latency of processor operations that involve memory accesses are affected by not only the processor's 104 workload performance, but also by the performance of the memory controller 108 and the speed of system memory 112.

One way to improve the processor 104 workload performance is to reduce memory access latency by employing cache memory. In this example, the processor-based system 100 in FIG. 1 includes a cache memory 114 that is accessible and shared by the processor cores 106(0)-106(N-1). Note that the processor cores 106(0)-106(N-1) may also contain respective private cache memories that are not shared between other processor cores 106(0)-106(N-1). A data request by a processor core 106(0)-106(N-1) can be communicated through the memory interconnect 110 to the cache memory 114. If such data request results in a cache miss to the cache memory 114, then the memory controller 108 is instructed to fetch the requested data from system memory 112. A copy of the fetched data from system memory 112 is also installed in the cache memory 114 associated with its memory address in system memory 112. The processor cores 106(0)-106(N-1) can continue to access the same data from the cache memory 114 for subsequent accesses to the same memory address as long as the data remains in the cache memory 114.

In the example of the processor-based system 100 in FIG. 1, the system memory 112 is provided as a series of eight (8) DRAM chips 116(0)-116(7) that each has a data signal width of 8 bits. The DRAM chips 116(0)-116(7) provide a "memory rank" or "rank" that is interfaced to the memory controller 108 through a shared address/data/control bus 118 in the memory interconnect 110. As shown in FIG. 1B, the DRAM chips 116(0)-116(7) are configured to assert eight bits (8 b) data on a respective data bus 120 in eight (8) bursts over four (4) clock cycles on each rising and falling edge of a clock (i.e., double data rate (DDR)) for a total of eight (8) bytes (8 B) per burst. Thus, the DRAM chips 116(0)-116(7) are capable of asserting a total of eight (8) 8-bit (i.e., 1 B) words in eight (8) bursts which are aggregated as a sixty-four (64) byte line that can be transferred to the cache memory 114 in the CPU 102 in FIG. 1A.

A large cache line size may be preferred for commercial processors to optimize workloads with dense data with high spatial locality. A large cache line size allows a larger amount of data to be read from system memory 112 into the cache memory 114 as a single memory operation quickly. However, if a workload is dominated by tasks that have a lower spatial locality, such as graph workloads, then the full data word for an entire cache line loaded from system memory 112 into the cache memory 114 may not need to be accessed. However, loading a full cache line into cache memory 114 consumes the full bandwidth of the data bus 120 of the address/control/data bus 118 and the internal data buses of the DRAM chips 116(0)-116(7), which may result in wasted power and bus bandwidth. This results in a lower available bandwidth made available to the processor 104 workload.

The processor 104 and system memory 112 could be configured to support a memory burst operation. A memory burst operation is where the DRAM chips 116(0)-116(7) are instructed to issue a reduced number of data bursts per memory request than the nominal number of support bursts, which is eight (8) in this example. But even in a burst chop memory access, the address/control bus 118 remains active for the same duration as a memory access not employing a burst chop. Thus, little or no bus bandwidth savings may be realized with a burst chop. Power consumption is reduced by the chopped bursts not causing the DRAM chips 116(0)-116(7) to assert the data for the chopped bursts onto the data bus 120. However, data is still accessed in memory cells within the DRAM chips 116(0)-116(7) for the chopped burst, which typically consumes more power than asserting data onto the data bus 120.

SUMMARY OF THE DISCLOSURE

Aspects disclosed herein include a memory system supporting programmable selective access to subsets of parallel-arranged memory chips for efficient memory accesses. The memory system comprises a plurality of memory chips each having an X-bit data width, where X is a positive whole number that is a power of two (2). The memory system also includes a memory interconnect that comprises a plurality of data buses each coupled to a dedicated memory chip among the plurality of memory chips such that the memory chips are configured in a parallel arrangement to the memory interconnect for transfer of data. The memory interconnect also includes at least one address/control bus coupled to the plurality of memory chips, and a plurality of chip select lines each coupled to a dedicated memory chip among the plurality of memory chips so that each memory chip can constitute a separate memory rank if desired. The memory system includes a memory controller coupled to the memory interconnect to be able to issue memory accesses to the memory chips to satisfy a memory access request issued by a processor. In exemplary aspects disclosed herein, the memory controller is programmable to selectively control the number of memory chips activated in a grouping for a memory access based on a memory access policy. The memory access policy is based on the number of memory chips desired to be activated to achieve the desired data line size for a given memory access. This programmability of the memory controller in performing memory accesses is made possible by separate dedicated chip select lines being coupled to each memory chip in the memory system. In contrast, if a shared chip select line were coupled to all of the memory chips in the memory system, then all of the memory chips would have to necessarily be activated by the memory controller for a memory access even if the bytes required by the memory access were less than the total bytes accessible in parallel when activating each of the memory chips.

As an example, if each memory chip in the memory system had an 8-bit data signal width and supported a memory burst mode of eight (8) memory bursts, then each memory access to a memory chip would return 64 bits or 8 bytes in a single memory access. If there are eight (8) memory chips total in the memory system, then the memory chips could return a total of 64 bits each in parallel, which is a total of 512 bits or 64 bytes in a single memory access. However, if a memory access request only required a 16-byte data line size for example, then 48 bytes of data would have still been asserted on data buses if all the memory chips were coupled to the same chip select line and activated to form the memory rank. This would needlessly consume data bus bandwidth and the associated power in activating such data buses for the unused 48 bytes. However, by the memory controller being programmable to individually activate specific memory chips, a single memory chip could be activated for example for the memory access calling for a 16-byte data line size as an example. In this example, the memory controller could be configured to perform two (2) successive memory accesses to a single memory chip that would return 8 bytes of data each for a total of 16 bytes. In this example, the minimum data signal width for a single memory access in the memory system is the data signal width of a single memory chip times the minimum memory burst size supported. This minimum data signal width is reduced if a burst chop is supported and enabled in the memory chip accessed. The maximum data signal width for a single memory access is the data signal width of a single memory chip times the maximum memory burst size times the number of memory chips in the memory system.

Thus, the memory system and programmability of the memory controller disclosed herein allows consecutive data bytes in memory to be stored in a single memory chip if desired, as opposed to having to stripe the data bytes among each memory chip. However, by the memory controller being programmable, the memory controller could also be configured to perform the same 16-byte memory access request example by selecting two memory chips where each 8-byte word of the 16-byte data is striped across the two memory chips. Also in disclosed examples, the address mapping of data can be programmable to stripe or not stripe data across multiple memory chips as a memory access policy based on the efficiency and performance considerations. As another example, the memory system disclosed herein supports the memory controller also being programmable to selectively access a desired number of words of a data signal width of a single memory chip by performing sequential memory accesses to a single memory chip for a given memory access request and either not activating a memory burst or activating a burst chop.

In this regard, in one exemplary aspect, a memory system for providing data storage for a processor is provided. The memory system comprises a plurality of memory chips each having a data signal width. Each memory chip among the plurality of memory chips is coupled to a dedicated data bus among a plurality of data buses in a parallel configuration, and each memory chip among the plurality of memory chips is coupled to a chip select line among a plurality of chip select lines. At least two (2) memory chips among the plurality of memory chips are coupled to at least one address/control bus. The memory system also comprises a memory controller coupled to a memory interconnect. The memory controller is configured to receive a memory access request comprising a memory address issued by a processor, determine a memory access policy comprising a data line size for the memory access request, the data line size being a multiple of the data bit, assert the memory address of the memory access request on the at least one address/control bus, and selectively assert one or more chip select enable signals on one or more chip select lines among the plurality of chip select lines corresponding to at least one memory chip among the plurality of memory chips at the memory address of the memory access request, based on the memory access policy.

In another exemplary aspect, a method of performing a memory access in a processor-based system is provided. The method comprises receiving a memory access request comprising a memory address issued by a processor to access data stored in a memory system comprising a plurality of memory chips each have a data signal width, each of the plurality of memory chips coupled to dedicated data bus among a plurality of data buses in a parallel configuration. The method also comprises determining a memory access policy comprising a data line size for the memory access request, the data line size being a multiple of a data signal width. The method also comprises asserting the memory address of the memory access request on at least one address/control bus coupled to the plurality of memory chips. The method also comprises selectively asserting one or more chip select enable signals on one or more chip select lines among a plurality of chip select lines each coupled to a dedicated memory chip among the plurality of memory chips, the one or more chip select lines corresponding to at least one memory chip among the plurality of memory chips at the memory address of the memory access request, based on the memory access policy. The method also comprises asserting stored data in the at least one memory chip associated with the asserted one or more chip select enable signals onto its associated dedicated data bus.

DETAILED DESCRIPTION

Figure 1A:
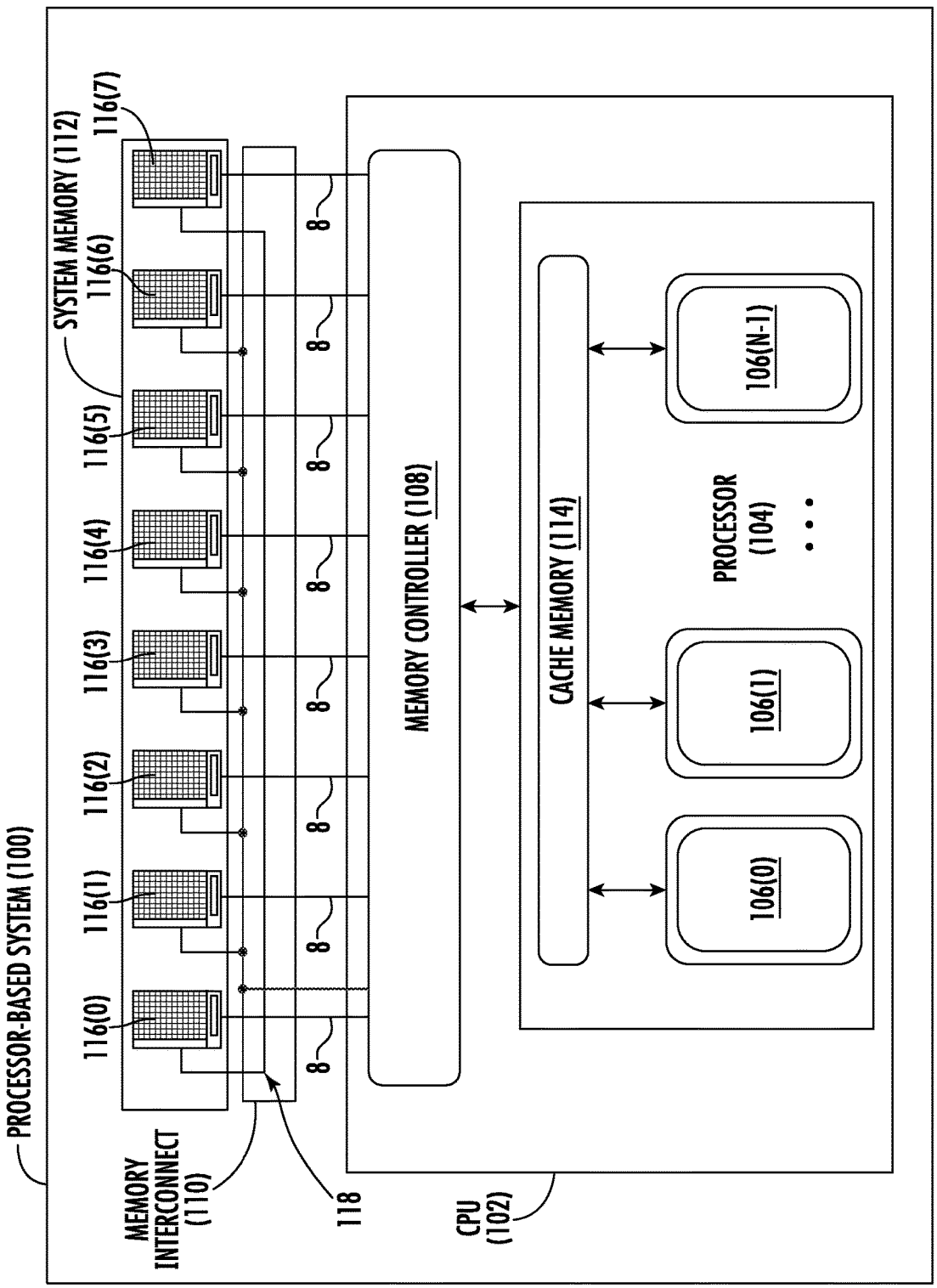
FIG. 1A is a diagram of a processor-based system that includes a processor and a system memory that includes a memory rank comprising a plurality of dynamic random access memory (RAM) (DRAM) chips each configured to be accessed in parallel.
Figure 1B:
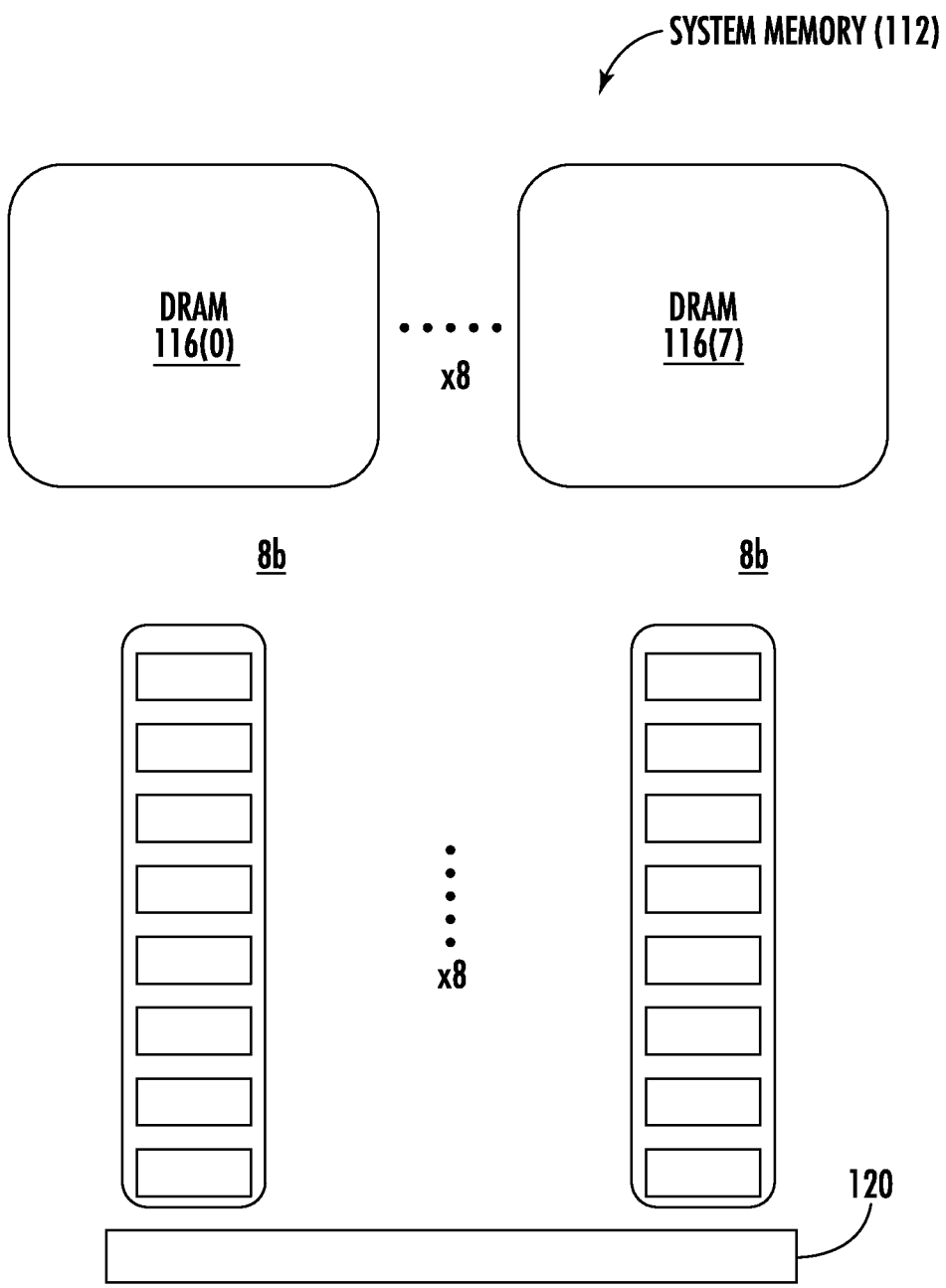
FIG. 1B is a diagram illustrating a memory burst for a memory access to the DRAM chips in the processor-based system in FIG. 1A.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include a memory system supporting programmable selective access to subsets of parallel-arranged memory chips for efficient memory accesses. The memory system comprises a plurality of memory chips each having an X-bit data width, where X is a positive whole number that is a power of two (2). The memory system also includes a memory interconnect that comprises a plurality of data buses each coupled to a dedicated memory chip among the plurality of memory chips such that the memory chips are configured in a parallel arrangement to the memory interconnect for transfer of data. The memory interconnect also includes at least one address/control bus coupled to the plurality of memory chips, and a plurality of chip select lines each coupled to a dedicated memory chip among the plurality of memory chips so that each memory chip can constitute a separate memory rank if desired. The memory system includes a memory controller coupled to the memory interconnect to be able to issue memory accesses to the memory chips to satisfy a memory access request issued by a processor. In exemplary aspects disclosed herein, the memory controller is programmable to selectively control the number of memory chips activated in a grouping for a memory access based on a memory access policy. The memory access policy is based on the number of memory chips desired to be activated to achieve the desired data line size for a given memory access. This programmability of the memory controller in performing memory accesses is made possible by separate dedicated chip select lines being coupled to each memory chip in the memory system. In contrast, if a shared chip select line were coupled to all of the memory chips in the memory system, then all of the memory chips would have to necessarily be activated by the memory controller for a memory access even if the bytes required by the memory access were less than the total bytes accessible in parallel when activating each of the memory chips.

Thus, the memory system and programmability of the memory controller disclosed herein allows consecutive data bytes in memory to be stored in a single memory chip if desired, as opposed to having to stripe the data bytes among each memory chip. However, by the memory controller being programmable, the memory controller could also be configured to perform a memory access request by selecting a subset of the available memory chips wherein the data is striped across only the subset of memory chips. Also in disclosed examples, the address mapping of data can be programmable to stripe or not stripe data across multiple memory chips as a memory access policy based on the efficiency and performance considerations. As another example, the memory system disclosed herein supports the memory controller also being programmable to selectively access a desired number of words of a data signal width of a single memory chip by performing sequential memory accesses to a single memory chip for a given memory access request and either not activating a memory burst or activating a burst chop.

Figure 2:
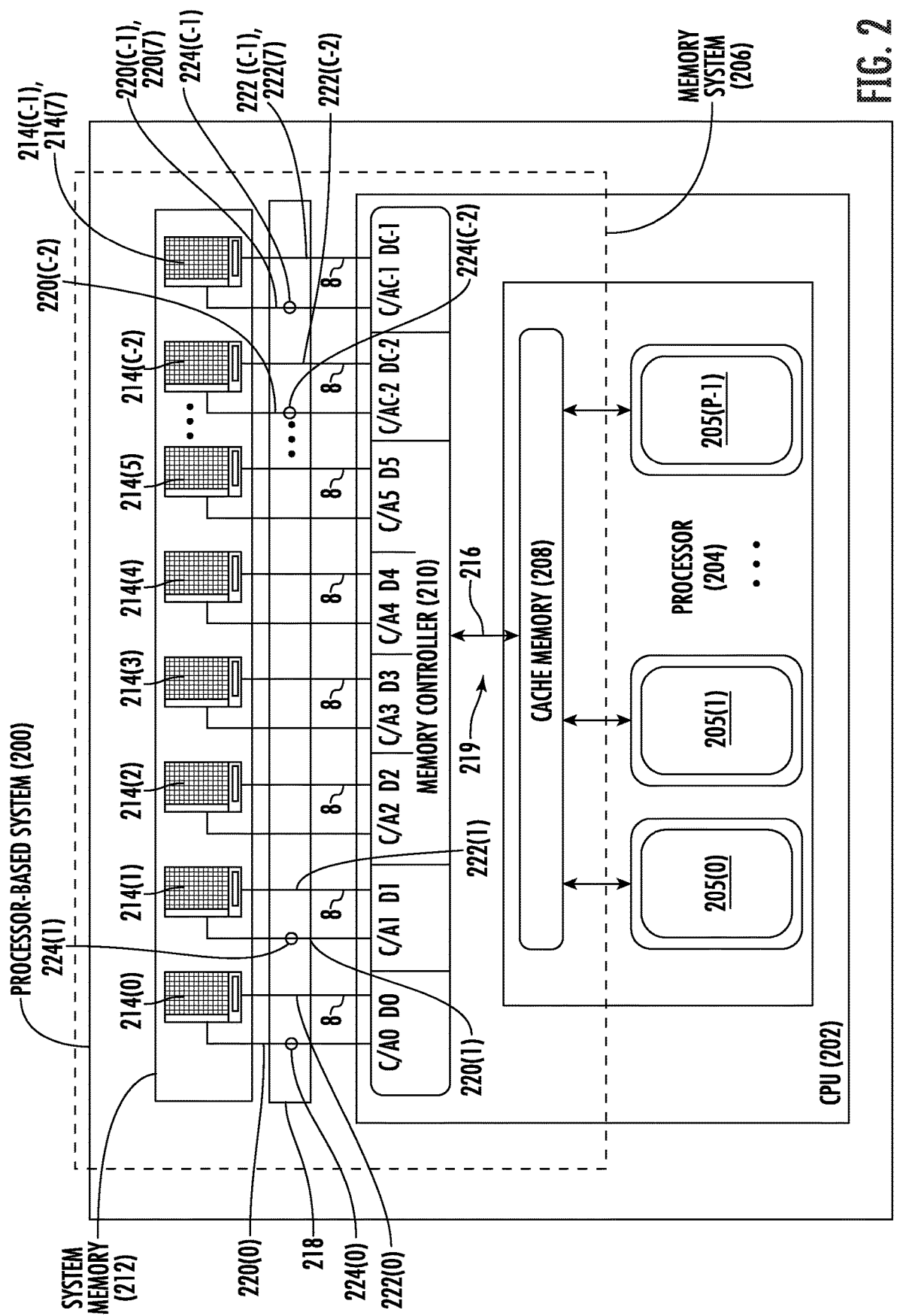
FIG. 2 is a diagram of an exemplary processor-based system that includes a central processing unit (CPU) with a processor that includes a memory system that includes a memory controller, cache memory, and system memory of parallel-arranged memory chips, wherein the memory system supports programmable selective access to subsets of the parallel-arranged memory chips for efficient memory accesses.

In this regard, FIG. 2 is a diagram of an exemplary processor-based system 200 that includes a CPU 202 that includes a processor 204. The processor 204 includes 'P' number of processor cores 205(0)-205(P−1) in this example, wherein 'P' is equal to any number of processor cores 205(0)-205(P−1) desired. The processor-based system 200 also includes a memory system 206 that includes a cache memory 208, a memory controller 210, a system memory 212 of 'C' number of parallel-arranged memory chips 214(0)-214(C−1). The memory controller 210 may be integrated on the same die that includes the CPU 202 such that the memory controller 210 is an integrated memory controller (IMC) on the die. In this non-limiting example, the memory chips 214(0)-214(C−1) are dynamic random access memory (RAM) (DRAM) chips. A memory read request by a processor core 205(0)-205(P−1) is first communicated through an interconnect bus 216 to the cache memory 208. If the memory read request results in a cache miss to the cache memory 208, then the memory controller 210 is instructed to fetch the requested data through a memory interconnect 218 to the system memory 212. The memory interconnect 218 is a circuit that provides an electrical interface for address/control buses 220(0)-220(C−1) and data buses 222(0)-222(C−1) to be routed between the processor 204 and the respective memory chips 214(0)-214(C−1) in the system memory 212. In this example, dedicated address/control buses 220(0)-220(C−1) and data buses 222(0)-222(C−1) are provided for each respective memory chip 214(0)-214(C−1). The processor 204 is configured to issue memory access requests 219 (e.g., reads and writes) to the system memory 212 through the memory interconnect 218. The memory controller 210 asserts a chip select enable signal and memory address on an address/control bus 220(0)-220(C−1) to address a particular memory chip 214(0)-214(C−1) for a memory access request. The memory controller 210 asserts data on a data bus 222(0)-222(C−1) to be written to an addressed respective memory chip 214(0)-214(C−1) for a memory write access. The memory controller 210 receives and aggregates data received on the data buses 222(0)-222(C−1) from an addressed respective memory chip 214(0)-214(C−1) for a memory read access.

Figure 3:
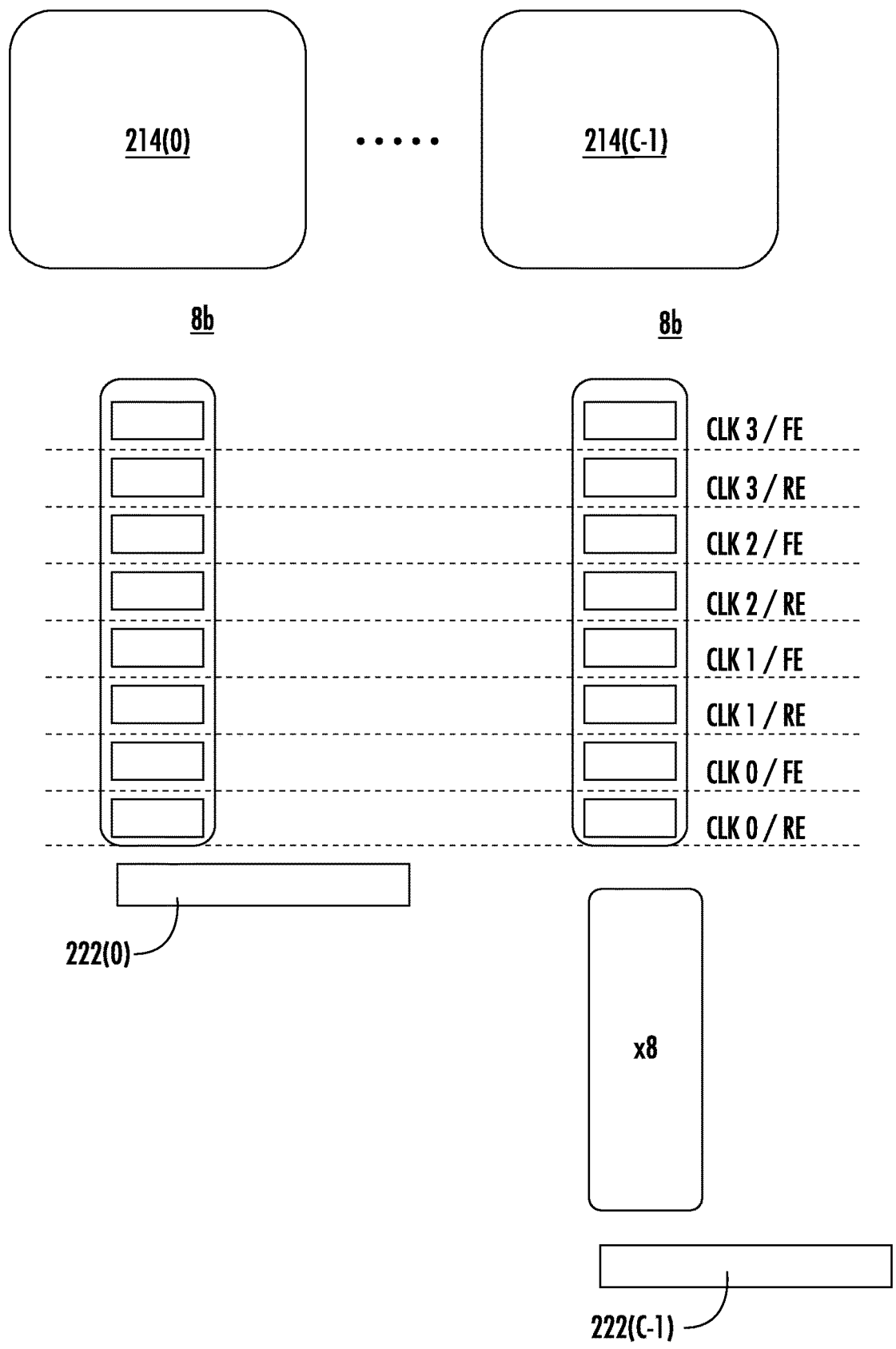
FIG. 3 illustrates an exemplary memory access to a single memory chip in the system memory in FIG. 2 in burst mode and to all of the memory chips in the system memory in burst mode.

In the example of the processor-based system 200 in FIG. 2, the data buses 222(0)-222(C−1) are each eight (8) bits wide, because the memory chips 214(0)-214(C−1) have an eight (8) bit data width as a non-limiting example. This means the memory chips 214(0)-214(C−1) can receive for a write request and assert for a read request eight (8) bits from and onto their respective data buses 222(0)-222(C−1) at a given time in response to a clock signal. If the memory chips 214(0)-214(C−1) are double data rate (DDR) memory chips, such as DDR DRAM chips, then the memory chips 214(0)-214(C−1) are configured to assert/receive eight (8) bits to/from their respective data buses 222(0)-222(C−1) on both a rising edge and falling edge of a clock signal. Also in this example, and as shown in FIG. 3, the memory chips 214(0)-214(C−1) are each configured to perform a memory access request that includes a burst mode consisting of eight (8) consecutive memory bursts. Thus, over a period of four (4) clock cycles, the memory chips 214(0)-214(C−1) can assert/receive eight (8) bits or one (1) byte (1 B) to/from their respective data buses 222(0)-222(C−1) on the respective rising edges (RE) and falling edges (FE) of the clock signals shown as CLK0-CLK3 in FIG. 3 for a total of eight (8) Bytes (B) (8 B). Thus, if there were eight (8) memory chips 214(0)-214(7) provided in the system memory 212, and each of the memory chips 214(0)-214(7 were activated in parallel by the memory controller 210 for a memory read operation in burst mode, then the memory chips 214(0)-214(7) would assert a total of 64 B (i.e., 8 B×8 memory chips 214(0)-214(7)) onto their respective data buses 222(0)-220(7).

This arrangement of parallel-arranged memory chips 214(0)-214(7) in the system memory 112 and a compatible memory interconnect 218 to support the parallelization of data from the memory chips 214(0)-214(7) provides for an efficient transfer of data to the processor 204. For example, the cache memory 208 in the CPU 202 may have 64 B sized cache lines such that a single memory read request to the system memory 112 can obtain data to fill an entire cache line in the cache memory 208. A processor 204 workload that has a high degree of spatial locality can benefit from the ability to load a large cache line into cache memory 208 in a single memory access. However, if the processor 204 workload is dominated by tasks that have a lower spatial locality, such as graph workloads, then a full cache line loaded from system memory 212 into the cache memory 208 may not need to be used by the processor 204. For example, the critical word needed to be used by the processor 204 may only be 8 B, yet a 64 B word is loaded into the cache memory 208. Loading a full cache line into the cache memory 208 consumes the full bandwidth of a data buses 222(0)-222(C−1) and the address/control buses 220(0)-220(C−1) as well as the internal data buses of the memory chips 214(0)-214(7), which may result in wasted power and bus bandwidth. This results in a lower available bandwidth made available to the processor 204 workload.

In this regard, as shown in the exemplary processor-based system 200 and discussed in more detail below, the memory interconnect 218 includes address/control buses 220(0)-220(C−1) that are dedicated to respective memory chips 214(0)-214(C−1). Within each address/control bus 220(0)-220(C−1) are non-shared chip select lines 224(0)-224(C−1) that are connected to and dedicated to each respective memory chip 214(0)-214(C−1). The memory controller 210 includes dedicated address/control pins C/A0-C/AC−1 and dedicated data bus pins D0-DC−1 to support providing dedicated address/control buses 220(0)-220(C−1) and data buses 222(0)-222(C−1) to each memory chip 214(0)-214(C−1). This allows the memory controller 210 to have the flexibility to address individual memory chips 214(0)-214(C−1) in the system memory 212 for a given memory access as individual memory ranks instead of having to address all of the memory chips 214(0)-214(C−1) together for a memory access as the memory rank. This is possible in part due to the memory system 206 and its memory interconnect 218 supporting dedicated chip select lines 224(0)-224(C−1) for each respective memory chip 214(0)-214(C−1) in the system memory 212. In this manner, the address mapping of data in the memory controller 210 can be programmed according to a memory access policy to selectively access individual memory chips 214(0)-214(C−1), subsets of the memory chips 214(0)-214(C−1), as well as all of the memory chips 214(0)-214(C−1) if desired, in the system memory 212 for a given memory access. The memory access policy can be based on the configured data line size of the data to be returned that is programmed for the memory controller 210. The bandwidth of the data bus 222(0)-222(C−1) of the memory chips 214(0)-214(C−1), and the associated power consumed by asserting data on such data bus 222(0)-222(C−1) is not consumed.

With continuing reference to FIG. 2, as another example, if a processor 204 issues a memory read request that only requires 8 B of data and a cache miss occurs to cache memory 208, then the memory controller 210 can be instructed to only read 8 B from the system memory 212 for the memory read. In this example, the memory controller 210 may be configured to select one (1) memory chip 214(0)-214(C−1) at the memory address of the memory read request that is mapped to the memory address of the memory read request by setting the lines of the address/control bus 220(0)-220(C−1) including the chip select line 224(0)-224(C−1) of such memory chip 214(0)-214(C−1). The selected memory chip 214(0)-214(C−1) can return 'Y' Bytes of data, which is 8 B of data in this example, on its respective data bus 222(0)-222(C−1) in burst mode as one example as previously discussed, if the memory chips 214(0)-214(C−1) support a burst mode. 'Y' is equal to the data signal width of a memory chip 214(0)-214(C−1) times its burst size.

Alternatively, the memory controller 210 can be programmed to perform selective memory accesses to a selected memory chip 214(0)-214(C−1) to return 8 B of data on its respective data bus 222(0)-222(C−1) as another example. As another alternative example, the memory controller 210 can be programmed to perform selective memory accesses to a selected memory chip 214(0)-214(C−1) to return 8 B of data on its respective data bus 222(0)-222(C−1)

even if the memory chips 214(0)-214(C−1) support burst mode. In this regard, the selected memory chip 214(0)-214(C−1) can be instructed to perform a burst chop operation to discard the additional bytes of data not desired to be accessed by the memory controller 210. Note that the memory controller 210 is programmed to map storage of data to the memory chips 214(0)-214(C−1) in the manner in which the data is to be retrieved. In this example, data is not striped across multiple memory chips 214(0)-214(C−1).

As another example, the memory controller 210 could be programmed to store data striped across multiple memory chips 214(0)-214(C−1) constituting the memory rank for a memory access if desired. For example, if it is determined as a design decision that the minimum number of bytes that can be retrieved in a single memory access in the processor-based system 200 in FIG. 2 is 16 B in the above example, then the memory controller 210 can be configured to stripe data across two (2) memory chips 214(0)-214(C−1) that are each configured to return 8 B onto their respective data buses 222(0)-222(C−1) in the same memory operation. The memory controller 210 could be programmed to store data striped across all the memory chips 214(0)-214(C−1) if desired. Burst chop could be employed to reduce returned data on the data buses 222(0)-222(C−1) as desired.

Thus, in the example of the processor-based system 200 and memory system 206 in FIG. 2, the minimum data signal width for a single memory access to the system memory 212 is the data signal width of a single memory chip 214(0)-214(C−1) times the minimum burst in the burst mode supported. This minimum data signal width is reduced if burst chop is supported and enabled in the memory chip 214(0)-214(C−1) accessed. The maximum data signal width for a single memory access is the data signal width of a single memory chip 214(0)-214(C−1) times the maximum burst size of the memory chips 214(0)-214(C−1), times the number of memory chips 214(0)-214(C−1) in the system memory 212.

The memory controller 210 could be configured to implement a data storage policy to the system memory 212 that cannot be changed or reprogrammed, and thus is static. A data storage policy controls how data is stored and accessed in the memory chips 214(0)-214(C−1) and thus which memory chips 214(0)-214(C−1) are activated for a memory access request from the memory controller 210. For example, one data storage policy may be to interleave or stripe data for contiguous memory addresses between memory chips 214(0)-214(C−1) in parallel. The memory controller 210 could be configured to set which memory chips 214(0)-214(C−1) and the number of memory chips 214(0)-214(C−1) that data is striped across for a striped data storage arrangement as part of a data storage policy. Another data storage policy may be to store data for contiguous memory addresses in the same memory chips 214(0)-214(C−1). This data storage arrangement can include a non-striped data storage arrangement where sequential memory addresses are supported by a single memory chip 214(0)-214(C−1) for their respective sequential memory address ranges. This data storage arrangement can include a striped data storage arrangement where sequential memory addresses are supported across multiple memory chips 214(0)-214(C−1) for their respective memory address ranges. The memory controller 210 could also be configured to allow for a dynamic data storage policy such that the memory controller 210 can be reprogrammed to change its data storage policy. However, in such case, if the data storage policy for the memory controller 210 is changed, then the memory mapping of the memory chips 214(0)-214(C−1) may also need to be changed. In this instance, the processor 204 may have to halt operations temporarily until the new data storage policy is programmed in the memory controller 210 so that memory access requests are not performed until the memory controller 210 is ready. The existing data stored in the system memory 212 that existed prior to a change in the memory storage and access architecture of the system memory 212 may need to be stored elsewhere and then reloaded by the memory controller 210 into the system memory 212 after the memory storage and access architecture reconfiguration is performed.

Figure 4:
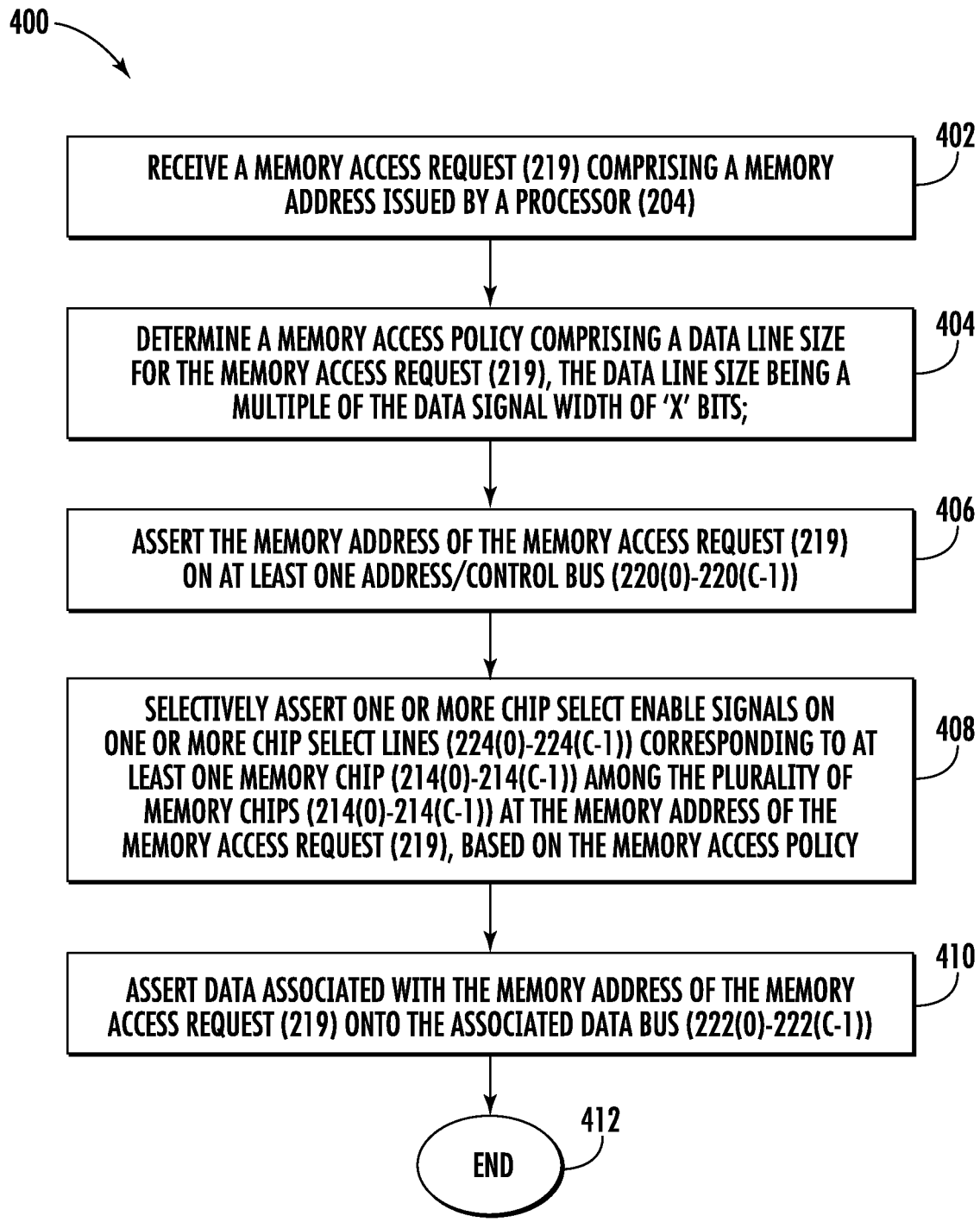
FIG. 4 is a flowchart illustrating an exemplary process of the memory controller in the CPU in FIG. 2 selectively accessing a number of parallel-arranged memory chips based on a memory access policy.

FIG. 4 is a flowchart illustrating an exemplary process 400 of the memory controller 210 in the memory system 206 in FIG. 2 selectively accessing a number of parallel-arranged memory chips 214(0)-214(C−1) based on a memory access policy. In this regard, the memory controller 210 receives a memory access request 219 comprising a memory address issued by the processor 204 (block 402 in FIG. 4). The memory controller 210 determines a memory access policy comprising a data line size for the memory access request 219, where the data line size is a multiple of the data signal width of 'X' bits of the memory chips 214(0)-214(C−1) (block 404 in FIG. 4). The memory controller 210 asserts the memory address of the memory access request 219 on the address/control bus(es) 220(0)-220(C−1) to provide the memory address to the memory chips 214(0)-214(C−1) for the memory access request 219 based on the determined memory access policy (block 406 in FIG. 4). The memory controller 210 also selectively asserts chip select enable signals on the chip select lines 224(0)-224(C−1) to activate the memory chips 214(0)-214(C−1) for the memory access request 219 based on the determined memory access policy (block 408 in FIG. 4). Note that this is possible, because as discussed above, separate dedicated chip select lines 224(0)-224(C−1) are provided in the memory interconnect 218 between the memory controller 210 and the system memory 212. Note that there is not a requirement that separate dedicated address bus(es) be provided to the memory chips 214(0)-214(C−1). An address asserted on the address/control bus(es) 220(0)-220(C−1) for memory chips 214(0)-214(C−1) not selected by the memory controller 210 for a memory access does not affect the memory access. In response to the memory controller 210 addressing and selecting the memory chips 214(0)-214(C−1) for a memory read access, the selected memory chips 214(0)-214(C−1) are configured to assert stored data associated with the memory address of the memory access request 219 onto its respective data bus 222(0)-222(C−1) (block 410 in FIG. 4). For a memory write access, the selected memory chips 214(0)-214(C−1) are configured to receive stored data associated from its respective data bus 222(0)-222(C−1) and store such data based on the memory address of the memory access request 219 (block 410 in FIG. 4), and the process ends (block 412 in FIG. 4).

Figure 5:
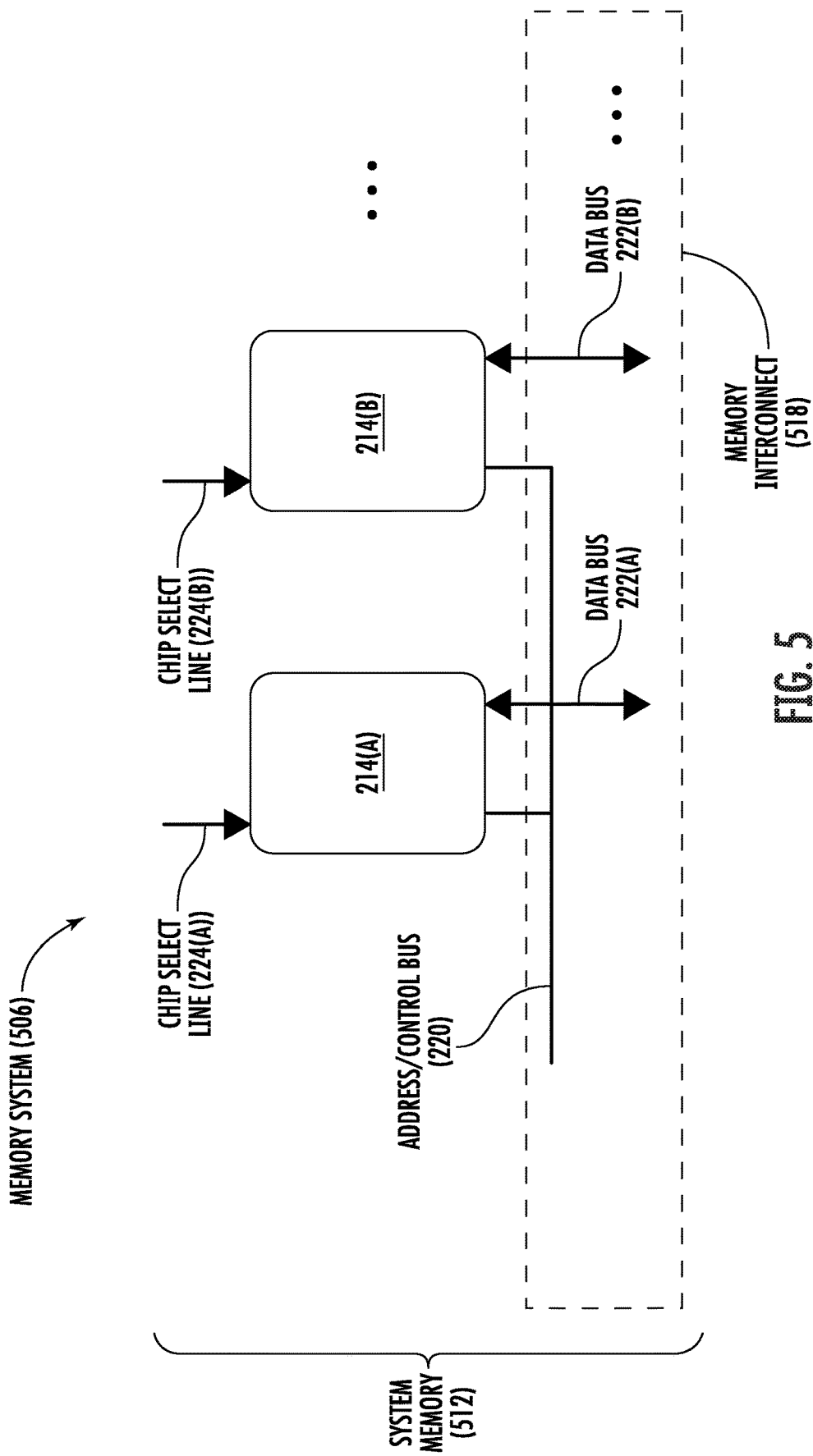
FIG. 5 is a diagram of an exemplary architecture of the memory system in the processor-based system in FIG. 2, wherein sets of two (2) memory chips among the plurality of memory chips share a common address and control bus for pin efficiency.

The memory system 206 and memory controller 210 in the processor-based system 200 in FIG. 2 can also be configured in other arrangements where more than one (1) memory chip 214(0)-214(C−1) in the system memory 212 is accessed for memory accesses. For example, FIG. 5 is a diagram of an exemplary architecture of a memory system 506 that can be the memory system 206 in the processor-based system 200 in FIG. 2. The memory system 506 in FIG. 5 includes a system memory 512 that can be the system memory 212 in FIG. 2. The memory system 506 groups the memory chips 214(0)-214(C−1) in the system memory 212 in FIG. 2 in one or more groupings of two (2) memory chips 214(A), 214(B). Only two (2) grouped memory chips 214

(A), 214(B) are shown in FIG. 5 for illustration purposes, but if the system memory 512 in FIG. 5 includes more than the two memory chips 214(A), 214(B), then these other memory chips could be grouped in pairs.

As shown in FIG. 5, the memory chips 214(A), 214(B) share a common address/control bus 220 for pin efficiency of a memory interconnect 518 that can be employed in the memory system 506. This is possible in this example without increasing memory access latency because of the particular memory chips 214(A), 214(B) being DDR memory chips where their respective data buses 222(A), 222(B) are doubled pumped by the memory controller 210 of FIG. 2. That is, two (2) data bits are transferred in each clock cycle—one bit on each edge of the clock signal. However, the address/control bus 220 operates at half the frequency of the data buses 222(A), 222(B) in this example. During an 8 B burst over four (4) clock signals, address/control information can be separately asserted even with a shared address/control bus 220 for each memory chip 214(A), 214(B). Therefore, one address/control bus 220 can provide separate address and control information on the shared common address/control bus 220 to keep the two (2) memory chips 214(A), 214(B) busy even though both memory chips 214(A), 214(B) are accessed individually as a separate memory rank to provide a theoretical maximum data bandwidth with an 8 B burst. This is described in more detail below for this example in the signal and timing diagrams in FIGS. 6 and 7.

Figure 6:
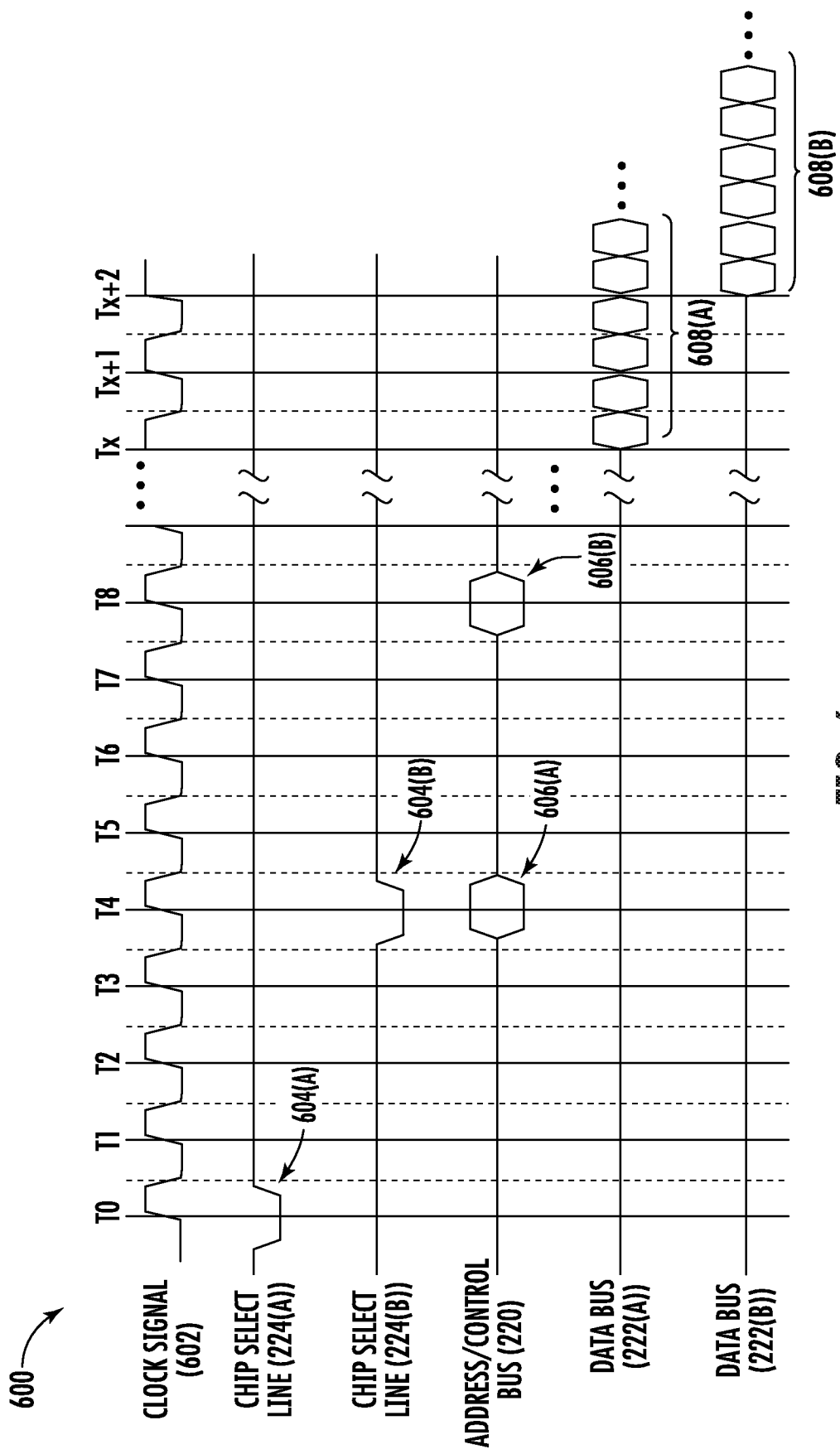
FIG. 6 is an exemplary signal and timing diagram of a memory read access to a subset of two memory chips according to the architecture in FIG. 5.

FIG. 6 is an exemplary signal and timing diagram 600 of a memory read access to the subset of two memory chips 214(A), 214(B) in the memory system 506 in FIG. 5 for DRAM memory chips, as an example. For example, the two memory chips 214(A), 214(B) in the memory system 506 could be double data rate (DDR) DRAM memory chips. A clock signal 602 is provided that drives the memory chips 214(A), 214(B) at double the frequency of the address/control bus 220. The memory controller 210 asserts a first chip select enable signal 604(A) on a first chip select line 224(A) to a first memory chip 214(A) having a first memory address space for a first memory read request in a first clock cycle of the clock signal 602 which is clock cycle T0. The memory controller 210 asserts a second chip select enable signal 604(B) on a second chip select line 224(B) to a second memory chip 214(B) having a second memory address space for a second memory read request in a second clock cycle of the clock signal 602 following clock cycle T0, which in this example is the clock cycle T4. The memory controller 210 asserts the first memory address and read instruction 606(A) on the address/control bus 220 of the first memory read request on the address/control bus 220 for the first memory chip 214(A) in a third clock cycle of the clock signal 602 following clock cycle T0, which in this example is also clock cycle T4. The first memory chip 214(A) then performs the burst operation to provide stored data 608(A) at the memory address in the first memory address and read instruction 606(A) as a burst in later clock cycles of the clock signal 602 that the respective first memory address and read instruction 606(A).

The burst operation by the memory chip 214(A) only takes four (4) clock cycles of clock signal 602 in this example, which is the same time consumed by two (2) clock cycles of a clock signal clocking the address/control bus 220. In this regard, the address/control bus 220 is free to accept the second address/control information for the second memory read request by memory controller 210 in clock cycle T5 of the clock signal 602. In this regard, the memory controller 210 asserts a second memory address and read instruction 606(B) on the address/control bus 220 of the second memory read request on the address/control bus 220 for the second memory chip 214(B) in clock cycle T8 of the clock signal 602 in this example. The read data is asserted by the memory chips 214(A), 214(B) on their separate data buses 222(A), 222(B) at later clock cycles starting at clock cycle Tx for four (4) clock cycles all of which are not shown in FIG. 6. The memory chips 214(A), 214(B) assert respective data 608(A), 608(B) onto their respective data buses 222(A), 222(B) in response to the assertion of the chip select enable signals 604(A), 604(B) and address/control information 606(A), 606(B).

Figure 7:
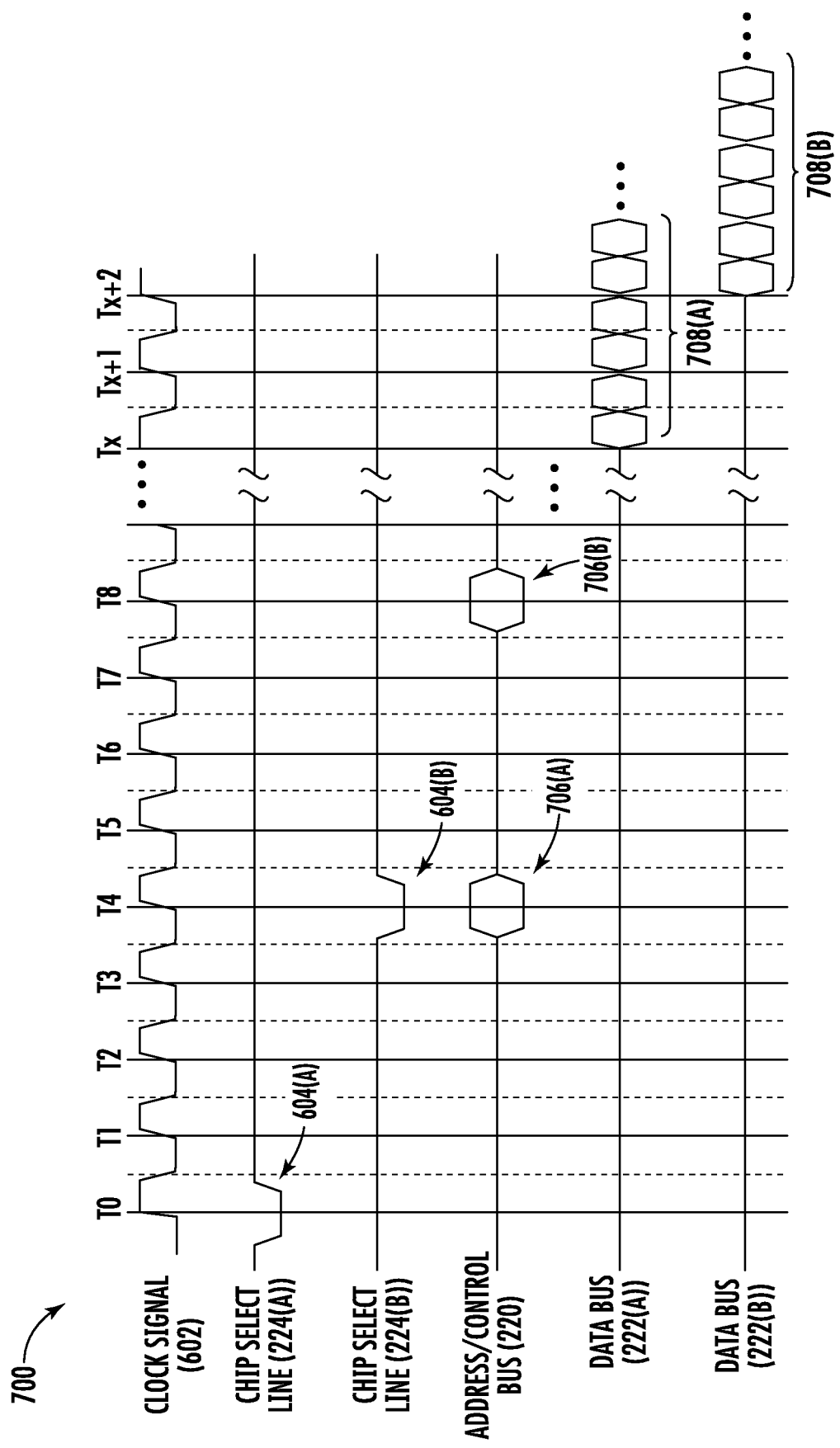
FIG. 7 is an exemplary signal and timing diagram of a memory write access to a subset of two memory chips according to the architecture in FIG. 5.

FIG. 7 is an exemplary signal and timing diagram 700 of a memory write access to the subset of two memory chips 214(A), 214(B) in the memory system 506 in FIG. 5 for DRAM memory chips. The clock signal 602 is provided that drives the memory chips 214(A), 214(B) at double the frequency of the address/control bus 220. The memory controller 210 asserts a first chip select enable signal 604(A) on a first chip select line 224(A) to a first memory chip 214(A) having a first memory address space for a first memory write request in a first clock cycle of the clock signal 602 which is clock cycle T0. The memory controller 210 asserts a second chip select enable signal 604(B) on a second chip select line 224(B) to a second memory chip 214(B) having a second memory address space for a second memory write request in a second clock cycle of the clock signal 602 following the first chip select enable signal 604(A) in clock cycle T0, which is clock cycle T4 in this example. The memory controller 210 asserts the first memory address and write instruction 706(A) on the address/control bus 220 of the first memory write request on the address/control bus 220 for the first memory chip 214(A) in a third clock cycle of the clock signal 602 following the clock cycle T0, which in this example is also clock cycle T4. The first memory chip 214(A) then performs the burst operation to provide stored data 708(A) at the memory address of the first memory address and write instruction 706(A) as a burst.

The burst operation by the memory chip 214(A) only takes four (4) clock cycles of clock signal 602, which is the rate two (2) clock cycles used to clock the address/control bus 220. In this regard, the address/control bus 220 is free to accept the second address/control information for the second memory write request by memory controller 210 in clock cycle T8 of the clock signal 602. The memory controller 210 asserts the second memory address and write instruction 706(B) on the address/control bus 220 of the second memory read request on the address/control bus 220 for the second memory chip 214(B) in clock cycle T8 of the clock signal 602 in this example. The write data is asserted by the memory controller 210 to the memory chips 214(A), 214(B) on their separate data buses 222(A), 222(B) at later clock cycles starting at clock cycle Tx for four (4) clock cycles all of which are not shown in FIG. 7. The memory chips 214(A), 214(B) receive the respective data words 708(A), 708(B) asserted on their respective data buses 222(A), 222(B) to be written.

Note that the timing diagrams in FIGS. 6 and 7 are non-limiting examples only. Other types of memory chips 214(A), 214(B) may have different timing characteristics and requirements, such as low power (LP) (DDR) DRAM memory chips.

Figure 8:
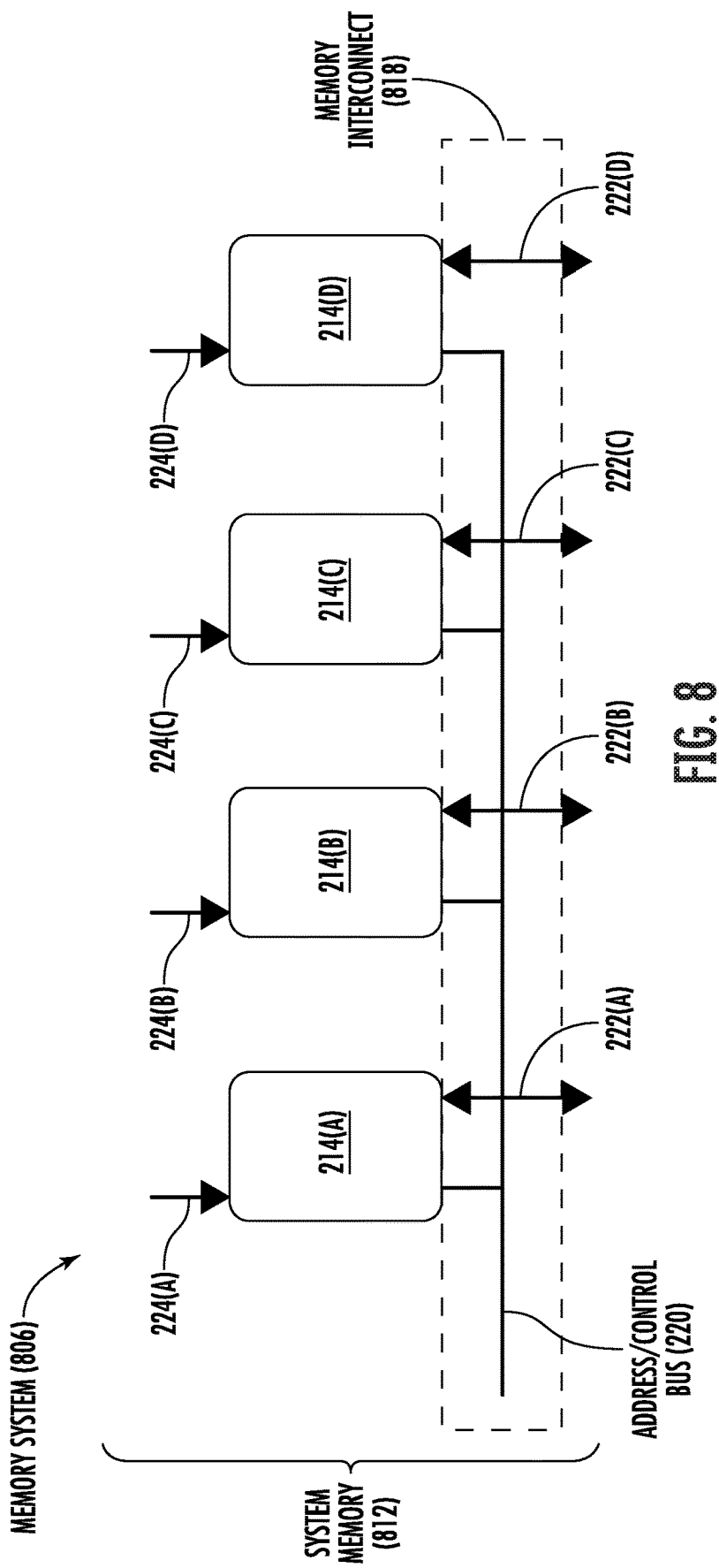
FIG. 8 is a diagram of an exemplary arrangement of the memory system in the processor-based system in FIG. 2, wherein sets of four (4) memory chips among the plurality of memory chips in system memory share a common address and control bus for pin efficiency.

FIG. 8 is a diagram of another exemplary architecture of a memory system 806 that can be the memory system 206 in the processor-based system 200 in FIG. 2. The memory system 806 in FIG. 8 includes a system memory 812 that can be the system memory 212 in FIG. 2. The memory system 806 groups the memory chips 214(0)-214(C-1) in the system memory 212 in FIG. 2 in groupings of four (4) memory chips 214(A), 214(B), 214(C), 214(D) that share a common address/control bus 220 for pin efficiency of a memory interconnect 818 that can be employed in the memory system 806. A respective chip select line 224(A), 224(B), 224(C), 224(D) is provided for each memory chip 214(A), 214(B), 214(C), 214(D). Each memory chip 214(A), 214(B), 214(C), 214(D) is coupled to a respective dedicated data bus 222(A), 222(B), 222(C), 222(D). A common address/control bus 220 can be shared among any number or grouping of memory chips as desired based on design tradeoffs between the number of pins and signals desired for the address/control buses, bandwidth, and cache line size. Note that although four (4) memory chips 214(A), 214(B), 214(C), 214(D) are shown in FIG. 8 as coupled to a common address/control bus 220, any number, including all of the memory chips provided in the system memory 812, could be coupled to a common address/control bus 220 if desired.

Figure 9:
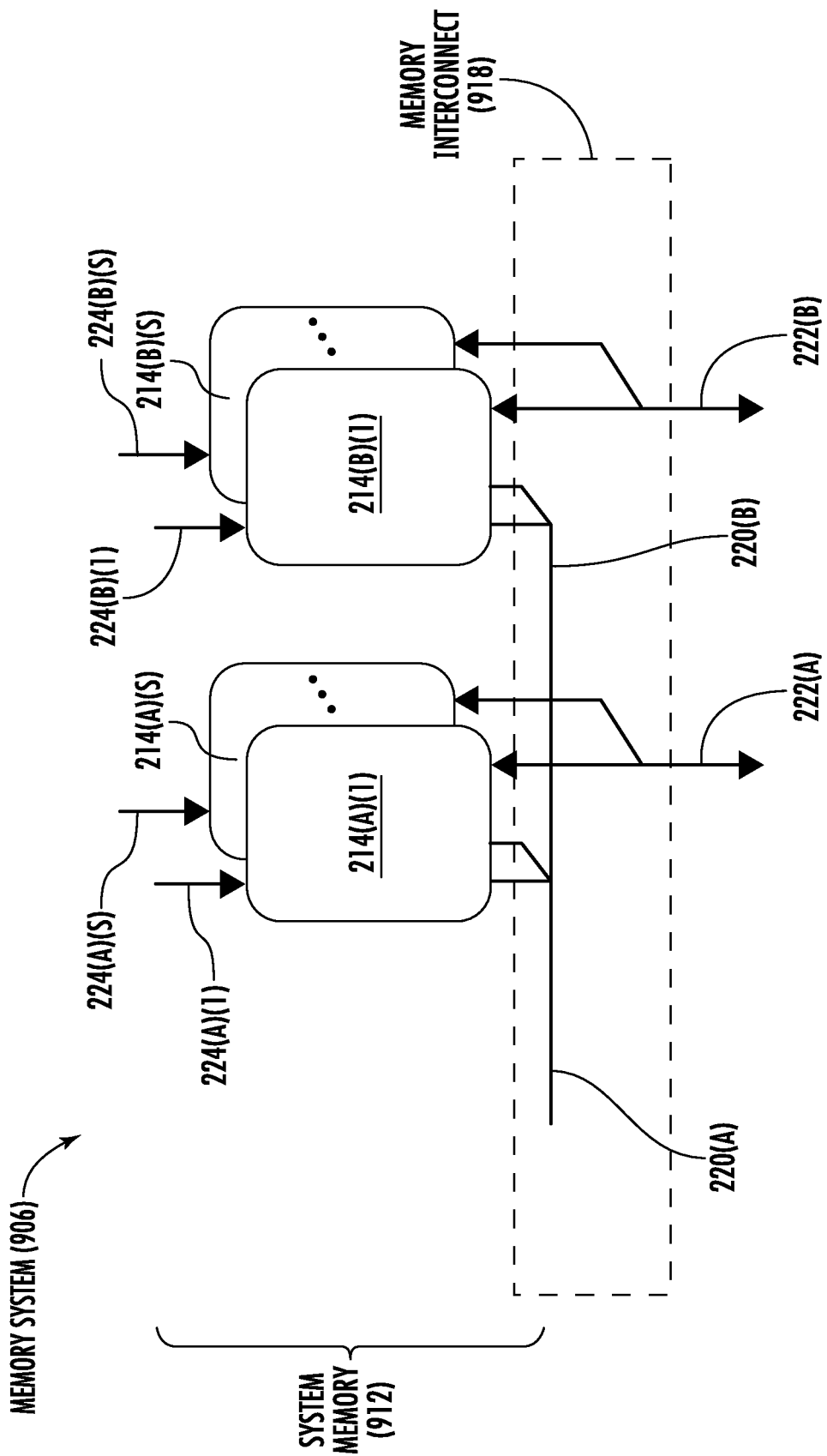
FIG. 9 is a diagram of an exemplary arrangement of the memory system in the processor-based system in FIG. 2, wherein a set of four (4) memory chips among the plurality of memory chips in system memory are provided in a shadow arrangement.

FIG. 9 is a diagram of another exemplary architecture of a memory system 906 that can be the memory system 206 in the processor-based system 200 in FIG. 2 that involves a system memory 912 that includes shadowed memory chips. Shadowed memory chips in this example means that one or more shadow memory chips and its respective primary memory chip share the same data bus, but have separate chip selects as part of an address control bus. Thus, each primary memory chip and its shadow memory chip(s) can be accessed as a separate memory rank for accessing and storing data. Memory capacity is increased with shadowed memory chips, but without an increase in data bus bandwidth, since the data bus is shared between the shadowed memory chips.

In this regard, with reference to FIG. 9, each memory chip shown as memory chips 214(A)(1), 214(B)(1) can be primary memory chips that have one or more shadow memory chips to form a respective memory rank. In this example, shadow memory chips 214(A)(S), 214(B)(S) are shown to signify that primary memory chip 214(A)(1) can have 'S' shadow memory chips 214(A)(2)-214(A)(S), and primary memory chip 214(B)(1) could have 'S' shadow memory chips 214(B)(2)-214(B)(S). The primary memory chip 214(A)(1) and its shadow memory chips 214(A)(2)-214(A)(S) are coupled to the same shared address/control bus 220(A) and data bus 222(A) of a memory interconnect 918 to form a memory rank. The primary memory chip 214(B)(1) and its shadow memory chips 214(B)(2)-214(B)(S) are coupled to the same shared address/control bus 220(B) and data bus 222(B). Since each primary memory chip 214(A)(1) and its shadow memory chips 214(A)(2)-214(A)(S), and each primary memory chip 214(B)(1) and its shadow memory chips 214(B)(2)-214(BXS) are coupled to separate dedicated chip select lines 224(A)(1)-224(A)(S), 224(B)(1)-224(B)(S), the memory controller 210 can select the desired memory chips.

Providing shadow memory chips increases memory capacity but does not increase impacting memory bandwidth since the data buses 222(A), 222(B) are shared between primary memory chip 214(A)(1) and its shadow memory chips 214(A)(2)-214(A)(S), and between primary memory chip 214(B)(1) and its shadow memory chips 214(B)(2)-214(BXS), respectively. Note also that one common shared address/control bus could be coupled to primary memory chip 214(A)(1) and its shadow memory chips 214(A)(2)-214(A)(S) and primary memory chip 214(B)(1) and its shadow memory chips 214(B)(2)-214(B)(S) if desired.

Note that the memory chips disclosed herein could include DRAM chips and is not limited to any particular type of memory. For example, the memory chips disclosed herein could include static RAM (SRAM) memory chips or FLASH memory chips as non-limiting examples. The memory chips disclosed herein could also include high bandwidth memory (HBM) memory chips. HBM is a memory that includes a high-performance interface according to JEDEC standard JESD235 in October 2013. HBM includes a second generation HBM2 according to the JEDEC standard JESD235a in January 2016. HBM can be provided as 3D-stacked SDRAM, and is manufactured by companies including Samsung, Advanced Micro Devices (AMD) and SK Hynix. HBM can be used in conjunction with high-performance graphics accelerators and network devices.

A memory system that includes a memory controller and system memory of parallel-arranged memory chips, wherein the memory system supports programmable selective access to subsets of the parallel-arranged memory chips for efficient memory accesses may be provided in or integrated into any processor-based device. Examples, without limitation, include a head-mounted display, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 10:
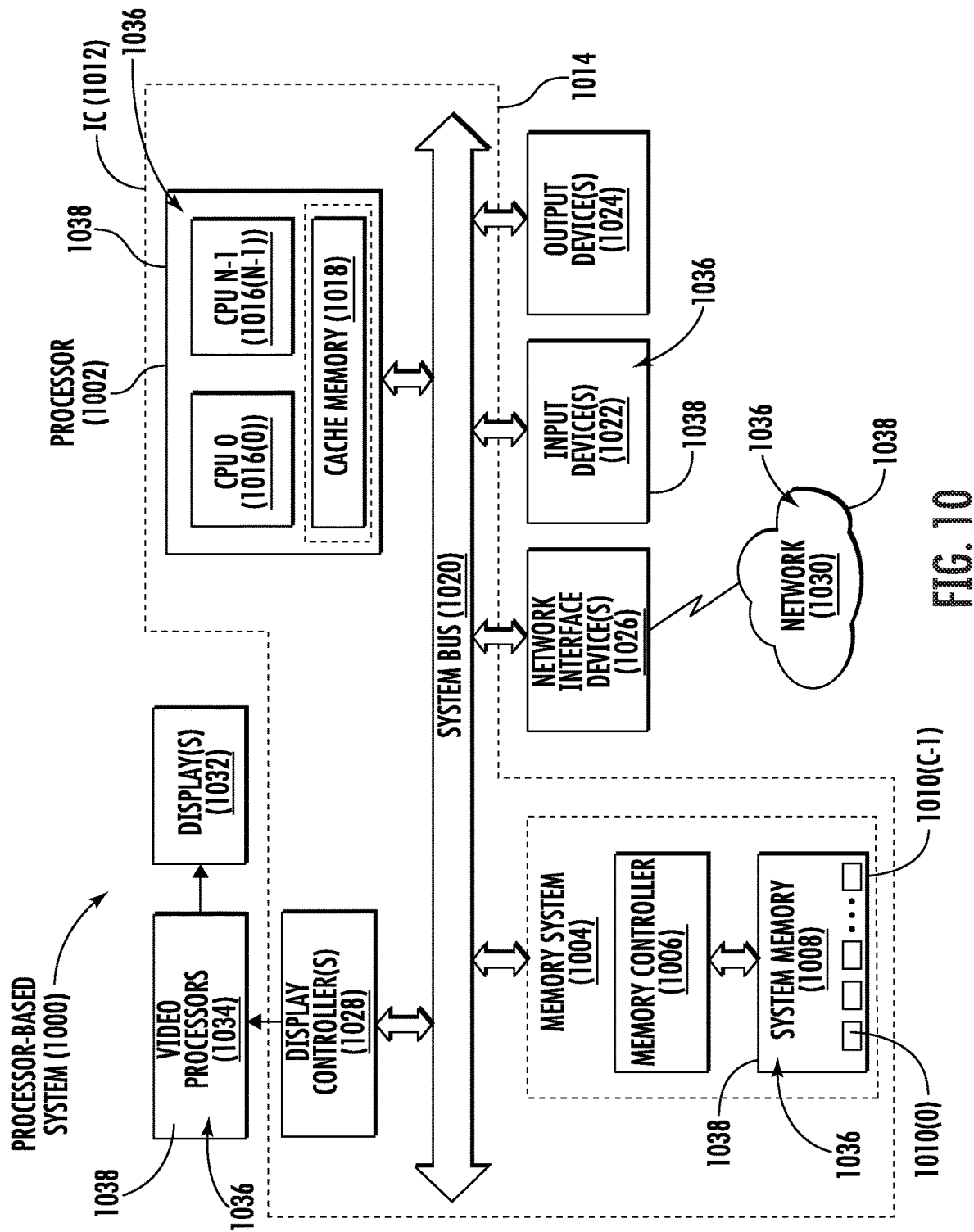
FIG. 10 is a block diagram of an exemplary processor-based system that includes a CPU with a processor that includes a memory system that includes a memory controller, cache memory, and system memory of parallel-arranged memory chips, wherein the memory system supports programmable selective access to subsets of the parallel-arranged memory chips for efficient memory accesses, and according to any of the exemplary aspects disclosed herein.

In this regard, FIG. 10 illustrates an example of a processor-based system 1000 that can include a processor 1002 configured to issue memory access requests to a memory system 1004. The memory system 1004 includes a memory controller 1006 and system memory 1008 of 'C' number of parallel-arranged memory chips 1010(0)-1010(C-1) that can be like the memory chips 214(0)-214(C-1) in the processor-based system 200 in FIG. 2. The memory controller 1006 is configured to perform a selective access to subsets of the parallel-arranged memory chips 1010(0)-1010(C-1) in the system memory 1008 for efficient memory accesses. In this example, the processor-based system 1000 is provided in an IC 1012. The IC 1012 may be included in or provided as a system on a chip (SoC) 1014. The processor 1002 includes one or more CPU cores 1016(0)-1016(N-1) and a cache memory 1018 and which is coupled to the CPU cores(s) 1016(0)-1016(N-1) for rapid access to temporarily stored data.

The processor 1002 is coupled to a system bus 1020 and can intercouple master and slave devices included in the processor-based system 1000. The processor 1002 communicates with these other devices by exchanging address, control, and data information over the system bus 1020. Although not illustrated in FIG. 10, multiple system buses 1020 could be provided, wherein each system bus 1020 constitutes a different fabric. For example, the processor 1002 can communicate bus transaction requests to the memory system 1004 as an example of a slave device.

Other master and slave devices can be connected to the system bus 1020. As illustrated in FIG. 10, these devices can include the memory system 1004 and one or more input devices 1022. The input device(s) 1022 can include any type of input device, including, but not limited to, input keys, switches, voice processors, etc. The other devices can also include one or more output devices 1024, and one or more network interface devices 1026 to audio, video, other visual indicators, etc. The other devices can also include one or more display controllers 1028 as examples. The network interface device(s) 1026 can be any device(s) configured to allow exchange of data to and from a network 1030. The network 1030 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1026 can be configured to support any type of communications protocol desired.

The processor 1002 may also be configured to access the display controller(s) 1028 over the system bus 1020 to control information sent to one or more displays 1032. The display controller(s) 1028 sends information to the display(s) 1032 to be displayed via one or more video processors 1034, which process the information to be displayed into a format suitable for the display(s) 1032. The display(s) 1032 can include any type of display, including, but not limited to, a cathode ray tube (CRT), a liquid crystal display (LCD), a plasma display, etc.

The processor-based system 1000 in FIG. 10 may include a set of instructions 1036 configured to be executed by the processor 1002. The instructions 1036 may be stored in the system memory 1008, the processor 1002, the input device 1022, the video processor(s) 1034, and the network 1030 as examples of non-transitory computer-readable medium 1038. The memory controller 1006 may also be configured to execute instructions 1036 to selectively access subsets of the parallel-arranged memory chips 1010(0)-1010(C−1) in the system memory 1008 for efficient memory accesses, and according to any of the aspects disclosed above and herein.

While the computer-readable medium 1038 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" can also include any medium that is capable of storing, encoding, or carrying a set of instructions for execution by the processing device and that cause the processing device to perform any one or more of the methodologies of the embodiments disclosed herein. The term "computer-readable medium" includes, but is not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design states imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A memory system for providing data storage for a processor, comprising:
   a plurality of memory chips each having a data signal width,
      each memory chip among the plurality of memory chips is coupled to a dedicated data bus among a plurality of data buses in a parallel configuration, and
      each memory chip among the plurality of memory chips is coupled to a chip select line among a plurality of chip select lines; and
      each memory chip among the plurality of memory chips is coupled to a dedicated address/control bus among a plurality of address/control buses;
   a memory controller coupled to a memory interconnect, the memory controller configured to:
      receive a memory access request comprising a memory address issued by the processor;
      determine a memory access policy comprising a data line size for the memory access request, the data line size being a multiple of the data signal width;
      assert the memory address of the memory access request on one or more address/control buses among the plurality of address/control buses corresponding to at least one memory chip among the plurality of memory chips at the memory address of the memory access request, based on the memory access policy; and
      selectively assert one or more chip select enable signals on one or more chip select lines among the plurality of chip select lines corresponding to the at least one memory chip among the plurality of memory chips at the memory address of the memory access request, based on the memory access policy.

2. The memory system of claim 1, wherein in response to the memory controller selectively asserting the one or more chip select enable signals on the one or more chip select lines among the plurality of chip select lines corresponding to the at least one memory chip among the plurality of memory chips at the memory address of the memory access request, based on the memory access policy:
   the at least one memory chip among the plurality of memory chips at the memory address of the memory access request is configured to assert stored data associated with the memory address onto its associated data bus.

3. The memory system of claim 1, wherein each of the plurality of memory chips is configured to:
   perform a memory burst operation based on a burst size; and
   assert Y number of bytes on its associated data bus equal to the data signal width multiplied by the burst size.

4. The memory system of claim 3, wherein:
   the plurality of memory chips comprises eight memory chips;
   each of the plurality of memory chips has a data signal width of eight bits;
   each of the eight memory chips is coupled to a dedicated data bus among the plurality of data buses comprising eight data buses;
   each of the eight memory chips is coupled to a chip select line among the plurality of chip select lines comprising eight chip select lines; and
   the memory controller is configured to, in response to determining the memory access policy comprises the data line size of 64 bytes:
      assert the memory address of the memory access request on the plurality of address/control buses; and
      selectively assert chip select enable signals on each of the eight chip select lines.

5. The memory system of claim 3, wherein the memory controller is configured to, in response to determining the memory access policy further comprises a burst chop, successively for each data signal width of the data line size:
   selectively assert the one or more chip select enable signals on the one or more chip select lines among the plurality of chip select lines corresponding to the at least one memory chip among the plurality of memory chips at the memory address of the memory access request;
   assert the memory address of the memory access request on the plurality of address/control buses; and
   assert a burst chop enable on the plurality of address/control buses based on the memory access policy.

6. The memory system of claim 1, wherein the memory controller is configured to selectively assert only one chip select enable signal on a chip select line among the plurality of chip select lines corresponding to the at least one memory chip among the plurality of memory chips at the memory address of the memory access request, based on the memory access policy.

7. The memory system of claim 1, wherein the memory controller is configured to selectively assert a subset of the one or more chip select enable signals on a subset of chip select lines among the plurality of chip select lines corresponding to the at least one memory chip among the plurality of memory chips at the memory address of the memory access request, based on the memory access policy.

8. The memory system of claim 1, wherein the memory controller further comprises an access mode indicator configured to indicate an access mode for the memory access request;
   the memory controller further configured to determine the access mode for the memory access request based on the access mode indicated in the access mode indicator; and
   in response to the access mode being a non-striped mode, the memory controller is configured to selectively assert only one chip select enable signal on a chip select line among the plurality of chip select lines corresponding to the at least one memory chip among the plurality of memory chips at the memory address of the memory access request, based on the memory access policy.

9. The memory system of claim 8, wherein:
   in response to the access mode being a striped mode, the memory controller is configured to selectively assert a subset of the one or more chip select enable signals on a subset of chip select lines among the plurality of chip select lines corresponding to the at least one memory chip among the plurality of memory chips at the memory address of the memory access request, based on the memory access policy.

10. The memory system of claim 1, wherein the plurality of memory chips is selected from the group consisting of a plurality of dynamic random access memory (RAM) (DRAM) chips, a plurality of static RAM (SRAM) memory chips, a plurality of FLASH memory chips, and a plurality of high bandwidth memory (HBM) chips.

11. The memory system of claim 1, wherein the memory controller is integrated into an integrated circuit comprising the processor.

12. The memory system of claim 1 integrated into an integrated circuit (IC).

13. A method of performing a memory access in a processor-based system, comprising:
receiving a memory access request comprising a memory address issued by a processor to access data stored in a memory system comprising a plurality of memory chips each having a data signal width, each of the plurality of memory chips coupled to a dedicated data bus among a plurality of data buses in a parallel configuration and each coupled to a dedicated address/control bus among a plurality of address/control buses;
determining a memory access policy comprising a data line size for the memory access request, the data line size being a multiple of the data signal width;
asserting the memory address of the memory access request on at least one address/control bus among the plurality of address/control buses coupled to a corresponding at least one memory chip among the plurality of memory chips at the memory address of the memory access request, based on the memory access policy;
selectively asserting one or more chip select enable signals on one or more chip select lines among a plurality of chip select lines each coupled to a dedicated memory chip among the plurality of memory chips, the one or more chip select lines corresponding to the at least one memory chip among the plurality of memory chips at the memory address of the memory access request, based on the memory access policy; and
asserting stored data in the at least one memory chip associated with the asserted one or more chip select enable signals onto its associated dedicated data bus.

14. The method of claim 13, further comprising:
determining if the memory access policy further comprises a burst chop; and
in response to determining the memory access policy comprises a burst chop, successively for each data signal width of the data line size:
selectively asserting a chip select enable signal on a chip select line among the plurality of chip select lines corresponding to the at least one memory chip among the plurality of memory chips at the memory address of the memory access request;
asserting the memory address of the memory access request on the at least one address/control bus corresponding to the at least one memory chip among the plurality of memory chips at the memory address of the memory access request, based on the memory access policy; and
asserting a burst chop enable on the at least one address/control bus based on the memory access policy.

15. The method of claim 13, comprising selectively asserting only one chip select enable signal on a chip select line among the plurality of chip select lines corresponding to the at least one memory chip among the plurality of memory chips at the memory address of the memory access request, based on the memory access policy.

16. The method of claim 13, comprising selectively asserting a subset of the one or more chip select enable signals on a subset of chip select lines among the plurality of chip select lines corresponding to the at least one memory chip among the plurality of memory chips at the memory address of the memory access request, based on the memory access policy.

17. The method of claim 13, further comprising:
determining an access mode for the memory access request; and
in response to the access mode being a non-striped mode, selectively asserting only one chip select enable signal on a chip select line among the plurality of chip select lines corresponding to the at least one memory chip among the plurality of memory chips at the memory address of the memory access request, based on the memory access policy.

18. The memory system of claim 17, further comprising:
in response to the access mode being a striped mode, selectively asserting a subset of the one or more chip select enable signals on a subset of chip select lines among the plurality of chip select lines corresponding to the at least one memory chip among the plurality of memory chips at the memory address of the memory access request, based on the memory access policy.

19. A memory system for providing data storage for a processor, comprising:
a plurality of double data rate (DDR) memory chips each having a data signal width,
each DDR memory chip among the plurality of DDR memory chips is coupled to a dedicated data bus among a plurality of data buses in a parallel configuration, and each DDR memory chip among the plurality of DDR memory chips is coupled to a chip select line among a plurality of chip select lines;
the plurality of DDR memory chips are arranged in a plurality of subsets of DDR memory chips each comprising at least two dedicated DDR memory chips; and
each subset of DDR memory chips among the plurality of subsets of DDR memory chips is coupled to a dedicated address/control bus among at least one address/control bus; and
a memory controller coupled to a memory interconnect, the memory controller configured to:
receive a memory access request comprising a memory address issued by the processor;
determine a data line size of a memory access policy for the memory access request; and
in response to determining the data line size of two data signal widths, the memory controller is configured to:
selectively assert a first chip select enable signal to a first DDR memory chip in the subset of DDR memory chips for the memory address of the memory access request in a first clock cycle of a clock signal;
selectively assert a second chip select enable signal to a second DDR memory chip in the subset of DDR memory chips for the memory address of the memory access request in a second clock cycle of the clock signal following the first clock cycle;
assert a first memory address of the memory access request on the at least one address/control bus for the first DDR memory chip in a third clock cycle of the clock signal following the first clock cycle; and
assert a second memory address of the memory access request on the at least one address/control bus for the second DDR memory chip in a fourth clock cycle of the clock signal following the third clock cycle.

20. The memory system of claim 19, wherein each of the plurality of DDR memory chips is configured to:
perform a memory burst operation based on a burst size; and assert Y number of bytes on its dedicated data bus equal to the data signal width multiplied by the burst size.

21. The memory system of claim 20, wherein the memory controller is further configured to, for each data signal width of the data line size:
   assert a first burst chop enable on the address/control bus coupled to the first DDR memory chip; and
   assert a second burst chop enable on the address/control bus coupled to the second DDR memory chip.

22. The memory system of claim 19, wherein the plurality of DDR memory chips is selected from the group consisting of a plurality of dynamic random access memory (RAM) (DRAM) chips, a plurality of static RAM (SRAM) memory chips, and a plurality of FLASH memory chips.

23. The memory system of claim 19, wherein the memory controller is integrated into an integrated circuit comprising the processor.

24. A memory system for providing data storage for a processor, comprising:
   a plurality of memory chips each having a data signal width,
      each memory chip among the plurality of memory chips is coupled to a dedicated data bus among a plurality of data buses in a parallel configuration, and
      each memory chip among the plurality of memory chips is coupled to a chip select line among a plurality of chip select lines;
   at least two memory chips among the plurality of memory chips are coupled to at least one address/control bus; and
   each of the plurality of memory chips is configured to:
      perform a memory burst operation based on a burst size; and
      assert Y number of bytes on its dedicated data bus equal to the data signal width multiplied by the burst size;
   a memory controller coupled to a memory interconnect, the memory controller configured to:
      receive a memory access request comprising a memory address issued by the processor;
      determine a memory access policy comprising a data line size for the memory access request, the data line size being a multiple of the data signal width; and
      in response to determining the memory access policy further comprises a burst chop, successively for each data signal width of the data line size:
         selectively assert one or more chip select enable signals on one or more chip select lines among the plurality of chip select lines corresponding to the at least two memory chips among the plurality of memory chips at the memory address of the memory access request;
         assert the memory address of the memory access request on the at least one address/control bus; and
         assert a burst chop enable on the at least one address/control bus based on the memory access policy.

25. The memory system of claim 24, wherein the plurality of memory chips is selected from the group consisting of a plurality of dynamic random access memory (RAM) (DRAM) chips, a plurality of static RAM (SRAM) memory chips, and a plurality of FLASH memory chips.

26. The memory system of claim 24, wherein the memory controller is integrated into an integrated circuit comprising the processor.

* * * * *